Aug. 20, 1940.  H. S. JOHNS  2,212,024
TUBULAR BELT CONVEYER
Filed Sept. 12, 1939
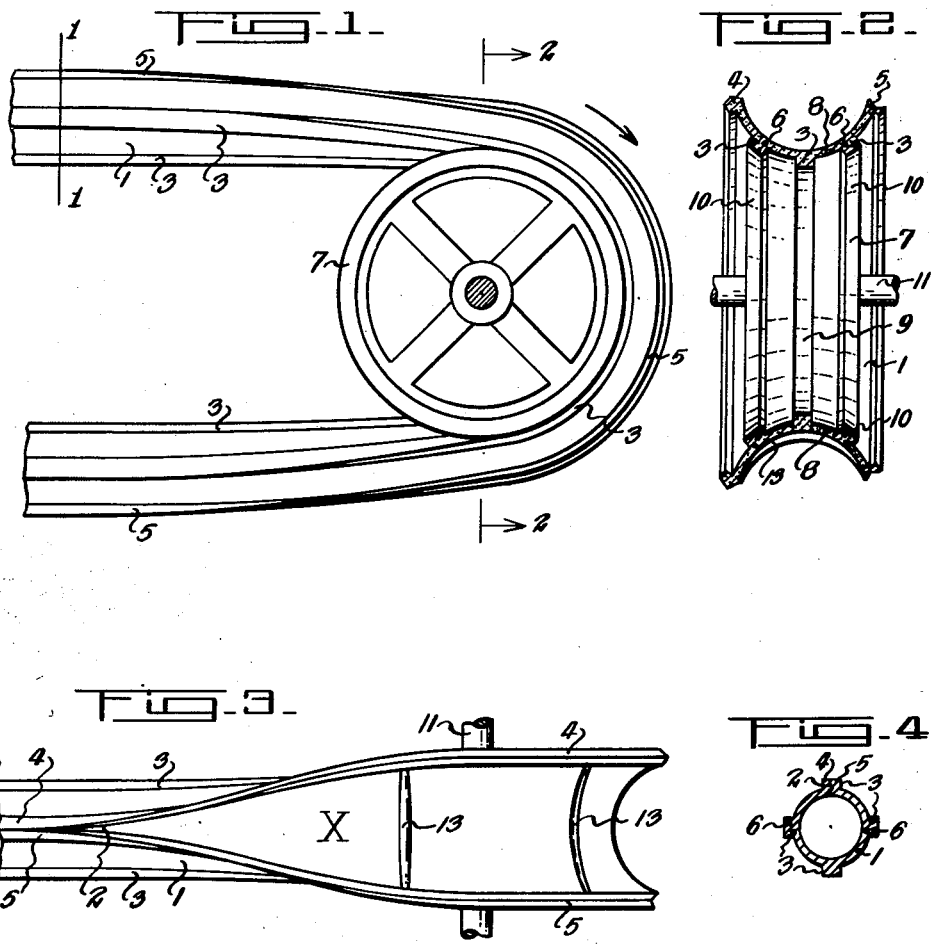
Inventor
Henry S. Johns
by
Atty.

UNITED STATES PATENT OFFICE 2,212,024

TUBULAR BELT CONVEYER

Henry Stinson Johns, Cleveland, Ohio, assignor to Bancroft Holdings Limited, Hamilton, Ontario, Canada, a company incorporated under joint-stock companies act of the Province of Ontario Application September 12, 1939, Serial No. 294,513

3 Claims. (Cl. 198—185)

My invention relates to improvements in tubular conveyer belts of the type disclosed in my United States Patent No. 2,013,242, September 3, 1935; No. 2,061,838, November 24, 1936; No. 2,108,488, February 15, 1938; and British Patent No. 444,549, June 18, 1934; wherein I showed my flexible rubber conveying tube as formed either of two trough-shaped belts which travel together to form a tube, or a unitary tubular belt formed with a longitudinal slit for the reception and discharge of material.

My present invention is more particularly directed towards my unitary tubular belt formed with a longitudinal slit for the reception and discharge of material, and the object of my invention is to furnish a grooved pulley over which the belt is carried, the pulley being so constructed that the belt in travelling therearound is split open along its slit for the reception and discharge of material.

A further object of my invention is to utilize my tube construction wherein I provide non-stretchable core elements, such as chains, embedded in the side ribs in combination with my particular type of pulley construction whereby the chain containing sides of the tube are drawn inwardly towards the axis of the pulley as the chains are non-stretchable in contradistinction to the elasticity of the rubber, whereby the splitting open of the belt in passing around the pulley is positively and easily achieved.

With the foregoing and other objects in view as shall hereinafter appear, my invention consists of a tubular belt opening pulley formed and arranged all as hereinafter more particularly described and illustrated in the accompanying drawing, in which:

Figure 1 is a side elevational view of my pulley showing my tubular belt passing therearound.

Figure 2 is an end elevational view of my pulley showing my belt in section thereof, such view being along the line 2—2, Figure 1.

Figure 3 is a plan view of the assembly shown in Figure 1, and,

Figure 4 is a cross-sectional view through the tube in the closed position as, for example, taken through the line 1—1, Figure 1.

Like characters of reference indicate corresponding parts in the different views in the drawing.

My unitary conveyer belt comprises a rubber tube 1 formed with a slit 2 running longitudinally of the tube for the reception and discharge of material. The tube, when in the normal material carrying position, is closed, as illustrated in Figure 4. The tube is preferably formed with four substantially equi-distant spaced apart ribs 3, one of the ribs being divided into two parts 4 and 5 by the slit 2. The contacting faces 4 and 5 can be of any suitable construction, and in the drawing I show one face in the form of an inward V and the other face in the form of an outward V, the faces interlocking, as shown in Figures 3 and 4. To retain the rubber tube against stretching, the two ribs on either side of the slitted rib each contain a chain 6 embedded therein.

In order to split open my belt, I carry it partially around a grooved pulley 7 substantially of the form illustrated in Figure 2. The pulley is formed with a major belt receiving groove 8, the groove 8 being transversely curved, and such curve being the sector of a circle of larger circumference than the circumference of the circular outer wall of the tube 1. The central portion of the groove 8 contains a slot 9 suitably dimensioned to receive the rib 3 on the opposite side of the tube to the slit 2. The two peripheral edges of the pulley are also cut away to form V-shaped grooves 10 which are suitably dimensioned and positioned to receive the chain containing side ribs 3 of the tube when the tube is in the stretched open position in passing around the pulley, as illustrated in Figure 2. The pulley 7 is carried upon a shaft 11 which can be either freely rotatable in suitable bearings or the pulley can be freely rotatable upon the shaft. In certain cases the pulley 7 may constitute the driving pulley for the conveyer, and in which case the pulley 7 is secured upon the shaft 11 and the shaft 11 rotated from any suitable source of power.

In describing the operation of my invention, I shall assume that the pulley is rotating in the direction of the arrow in Figure 1 and that material is being discharged from the tube. The tube approaches the pulley in the closed position, as illustrated in Figure 4, and upon reaching the vicinity of the pulley, is spread open as illustrated in Figure 3.

In erecting the conveyer and adjusting the tube upon the pulley 7, the rib 3 on the opposite side of the tube to the slit 2 is positioned within the groove 9 in the pulley. As the tube is substantially taut at all times, and as the chains 10 cannot stretch, while the rubber in the tube is elastic, it will be apparent that as the transverse curvature of the groove 8 in the pulley is shallower than the curvature of the round tube, the tube will split open in the manner illustrated in Figure 2, so that material can be discharged. As the tube leaves the pulley 7, it will gradually close and return to its completely closed position, as illustrated in Figure 4.

If it is desired to utilize my invention for the reception of material into the tube, it will be apparent, for example in Figure 1, that it is only necessary to reverse the direction of movement of the tube and the pulley 7, and to provide a material feeding tube or spout which would direct material into that portion of the tube indicated by the letter X in Figure 3.

In order to retain material from slipping in the tube, particularly in the case of substantially vertical lifts, the inner face of the tube can be formed with a plurality of ribs 13 which are also formed of rubber, preferably moulded integrally with the tube. It is understood that my tube is formed of an elastic rubber-like material and that the only form of reinforcement against stretching is the chains 6 or other similar means embedded within the side ribs 3, and that also the tube is pre-formed into the tubular shape as illustrated in Figure 4.

Although I have shown my pulley 7 as provided with grooves of a particular form and shape, it is to be understood that I can make such changes and alterations as I may from time to time deem necessary without departing from the spirit of my invention as set forth in the appended claims.

What I claim as my invention is:

1. In a tubular belt conveyer of the character described, the combination with a moving preformed tube having the elastic characteristics of rubber and formed with a material carrying bore and having a longitudinally extending slit-like opening through the wall thereof and a pulley around which the tube partially extends in a spread open position with its slitted portion stretched and outermost from the pulley, of a pair of flexible non-stretchable elements embedded in the sides of the tube and spaced away from the slit, the non-stretchable elements being under tension and drawing the elastic tube from its pre-formed tubular shape into a spread open position with the stretched sides of the tube drawn towards the face of the pulley.

2. In a tubular belt conveyer of the character described, the combination with a moving preformed tube having the elastic characteristics of rubber and formed with a material carrying bore and having a longitudinally extending slit-like opening through the wall thereof and a pulley around which the tube partially extends, said pulley having a transversely curved groove in the face thereof in which the tube is contained in a spread open position with its slitted portion outermost from the pulley, the transverse curve in the pulley groove being substantially the sector of a circle of greater circumference than the circumference of the circular outer wall of the tube, of a pair of flexible non-stretchable elements embedded in the sides of the tube and spaced away from the slit, the non-stretchable elements being under tension and drawing the elastic tube from its pre-formed tubular shape into a spread open position with the sides of the tube drawn towards the face of the pulley.

3. In a tubular belt conveyer of the character described, a pre-formed tube having the elastic characteristics of rubber and formed with a material carrying bore and having a longitudinally extending slit-like opening through the wall thereof, a pair or ribs positioned substantially opposite one another on the outer face of the tube and spaced away from the slit, chains embedded in the ribs to retain the belt against stretch, and a pulley around which the tube partially extends and having a transversely curved groove in the face thereof in which the tube is contained in a spread open position with its slitted portion outermost from the pulley, the transverse curve in the pulley groove being substantially the sector of a circle of greater circumference than the circumference of the circular outer wall of the tube, the chains being under tension and drawing the elastic tube from its pre-formed tubular shape into a spread open position with the ribs and spread open sides of the tube drawn towards the face of the pulley.

HENRY STINSON JOHNS.